United States Patent
Seaton

[11] Patent Number: 5,158,164
[45] Date of Patent: Oct. 27, 1992

[54] ONE-WAY CLUTCH WITH OVERRIDING MECHANICAL CLUTCH

[75] Inventor: Clarence A. Seaton, Shirland, Ill.

[73] Assignee: Zurn Industries, Inc, La Grange, Ill.

[21] Appl. No.: 759,235

[22] Filed: Sep. 13, 1991

[51] Int. Cl.⁵ .............................................. F16D 41/08
[52] U.S. Cl. ...................................... 192/47; 192/45; 192/48.92
[58] Field of Search ................. 192/47, 45; 192/48.92; 188/82.3

[56] References Cited

U.S. PATENT DOCUMENTS

| | | | |
|---|---|---|---|
| 1,823,113 | 9/1931 | Miller et al. | 192/47 |
| 1,946,177 | 2/1934 | Neurath | 192/47 X |
| 2,293,095 | 8/1942 | Anderson | 192/47 |
| 3,175,667 | 3/1965 | Marland | 192/45 X |
| 3,380,564 | 4/1968 | Beurer | 192/47 X |

FOREIGN PATENT DOCUMENTS 131309  11/1920  United Kingdom .................. 192/47

Primary Examiner—Richard Lorence
Attorney, Agent, or Firm—Marhsall A. Burmeister

[57] ABSTRACT

A rotational torque transmission unit in which the input and output shafts are isolated from each other and may be selectively coupled through a lubricated one-way clutch, the one-way clutch having an outer race in the form of a cylindrical cup mounted on the output shaft and an inner race assembly carrying clutch members slidably engaging the input shaft and translatable thereon between a first position on the input shaft within the cylindrical cup and a second position on the input shaft remote from the cylindrical cup, the cylindrical cup being provided with an outwardly flaring conical member to guide the clutch members into the cylindrical cup from the second position on the input shaft.

7 Claims, 3 Drawing Sheets

ONE-WAY CLUTCH WITH OVERRIDING MECHANICAL CLUTCH

The present invention relates to one-way clutches, and to assemblies including one-way clutches.

BACKGROUND OF THE INVENTION

One-way clutches have been used for many years to provide drive in one rotational direction of a shaft but to provide free wheeling in the reverse rotational direction. For most applications, the shaft to be controlled is divided into two parts, and an inner race is mounted on the one part of the shaft and an outer race is mounted on the other part of the shaft confronting the inner race. The inner and outer races are coupled to each other by a plurality of clutch members which wedge between the races for torques applied in one rotational direction and slide between the races for torques applied in the reverse rotational direction. In practice, the clutch members are either rollers or sprags, and in either case, they are generally mounted in an assembly between the inner and outer races of the clutch.

There are many applications in which one-way clutches are employed to permit a second power source to be selectively applied to a load. The second power source is coupled through a one-way clutch to a load, and the load is also connected to its main drive. If the main drive fails, or is shutdown, the second power source becomes effective on the load through the one-way clutch, but if the main drive is driving the load at a higher rotational rate than the second power source, the one-way clutch disengages the second power source and operates in a free wheeling state.

During periods in which equipment is being serviced, it is often desirable to disengage the input and output shafts of the one-way clutch so that a hazardous condition cannot develop. If the one-way clutch should lock-up in free wheeling condition during servicing, for whatever reason, service work on the input side of the one-way clutch could be hazardous.

U.S. Pat. No. 3,175,667, of Joseph A. Marland, entitled One Way Clutch with Splash and Gravity Flow Lubricating System discloses a one-way clutch which is provided with a brake on the input shaft which can hold the equipment connected to the input shaft at rest. With the brake engaged, it may not be possible to perform the maintenance work required. Further, locking the input shaft may not be adequate safety precautions for servicing equipment disposed on the output shaft.

It is an object of the present invention to reduce hazard during servicing operations of applications utilizing one-way clutches by providing means within the one-way clutch assembly to isolate the input and output shafts of the one-way clutch. It is also an object of the present invention to provide a one-way clutch assembly in which the input and output shafts may be selectively isolated and interconnected by mechanical means. It is a further object of the present invention to provide means to selectively isolate and couple the input and output shafts of a one-way clutch assembly which is actuable from outside of the one-way clutch assembly. Further, it is an object of the present invention to provide the foregoing objects of the invention with a construction in which the means for selectively isolating the input and output shafts does not adversely effect the longevity of the one-way clutch. .

One-way clutches depend upon proper lubrication for longevity. It is, therefore, an object of the present invention, to provide a one-way clutch assembly in which the input and output shafts of the assembly may be selectively isolated and intercoupled which does not adversely effect lubrication of the one-way clutch.

BRIEF STATEMENT OF INVENTION

The inventor has provided a one-way clutch assembly utilizing a housing to journal an input shaft and an output shaft on a common axis. One of the shafts carries a cup shaped member with a cylindrical recess extending therein from one end to form an outer race of a one-way clutch, and the other shaft carries a hub with an outer substantially cylindrical surface disposed coaxially with the shafts and forming an inner race for the one-way clutch. A plurality of clutch members are mounted on the inner or outer race and the clutch members are adapted to engage the inner and outer races when the hub is rotated in one direction but disengage the inner and outer races when the hub is rotated in the reverse direction. In addition, the hub is slidably mounted on the after shaft, and mechanical means are provided to translate the hub between two positions on said shaft, namely, one position in which the hub is disposed within the recess of the cup-shaped member, and another position in which the hub is outside of the recess of the cup-shaped member. In the latter position, the input and output shafts are isolated from each other.

Preferably, the clutch members are rollers, and one of the races is provided with an inclined plane engaging each of the rollers. The rollers are mounted within a cage to form a roller assembly and the roller assembly is attached to one of the races. The cage remains with that race when the other race is translated from the roller assembly. The other race is also provided with guide means to facilitate translating the one race with the attached roller assembly into confrontation with the other race.

DESCRIPTION OF THE DRAWINGS

The objects and advantages of the present invention will be more readily understood with reference to the accompanying drawings, in which.

PREFERRED EMBODIMENT OF THE INVENTION

Figure 1:
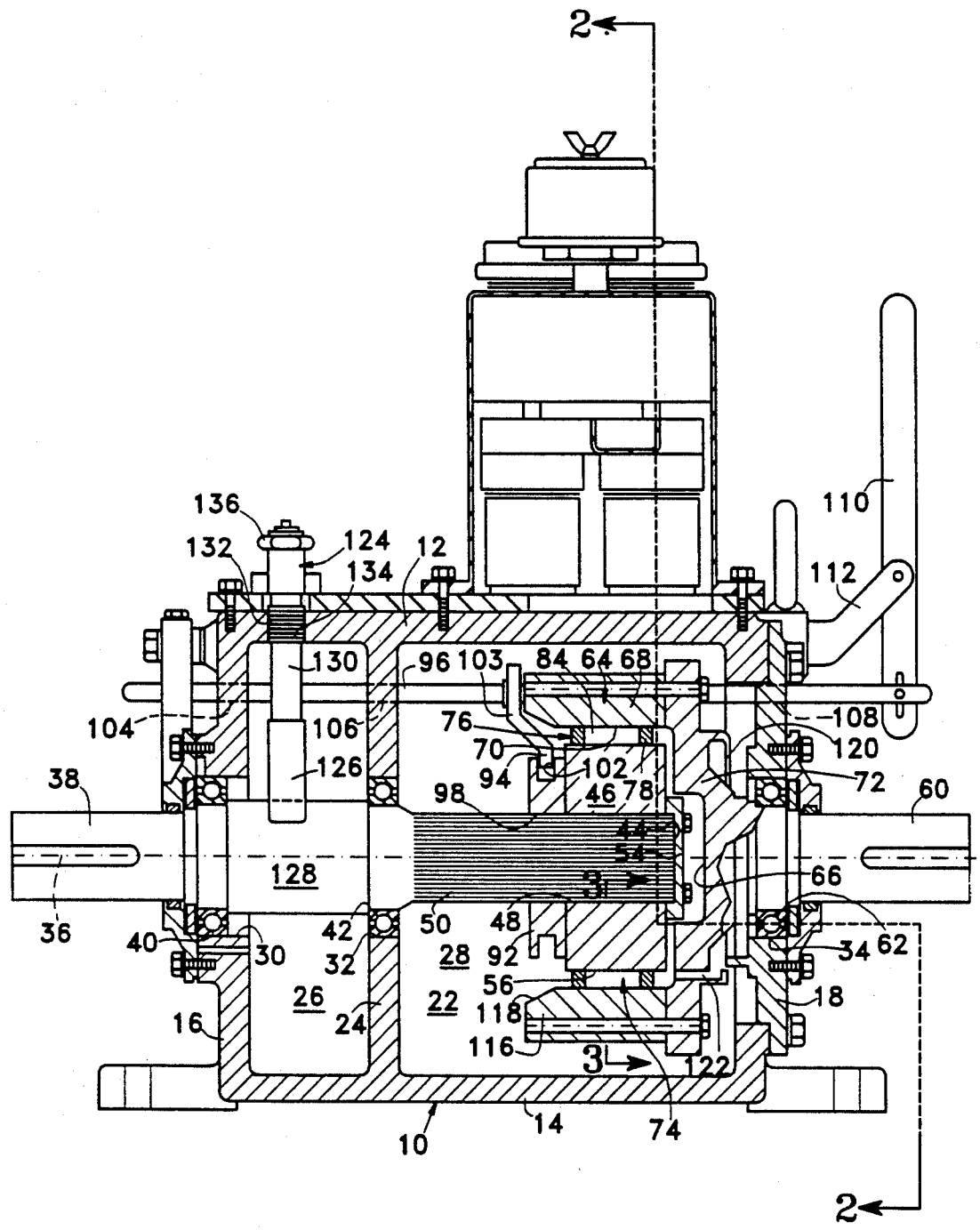
FIG. 1 is a central sectional view of a one-way clutch assembly constructed in the manner of the present invention.
Figure 2:
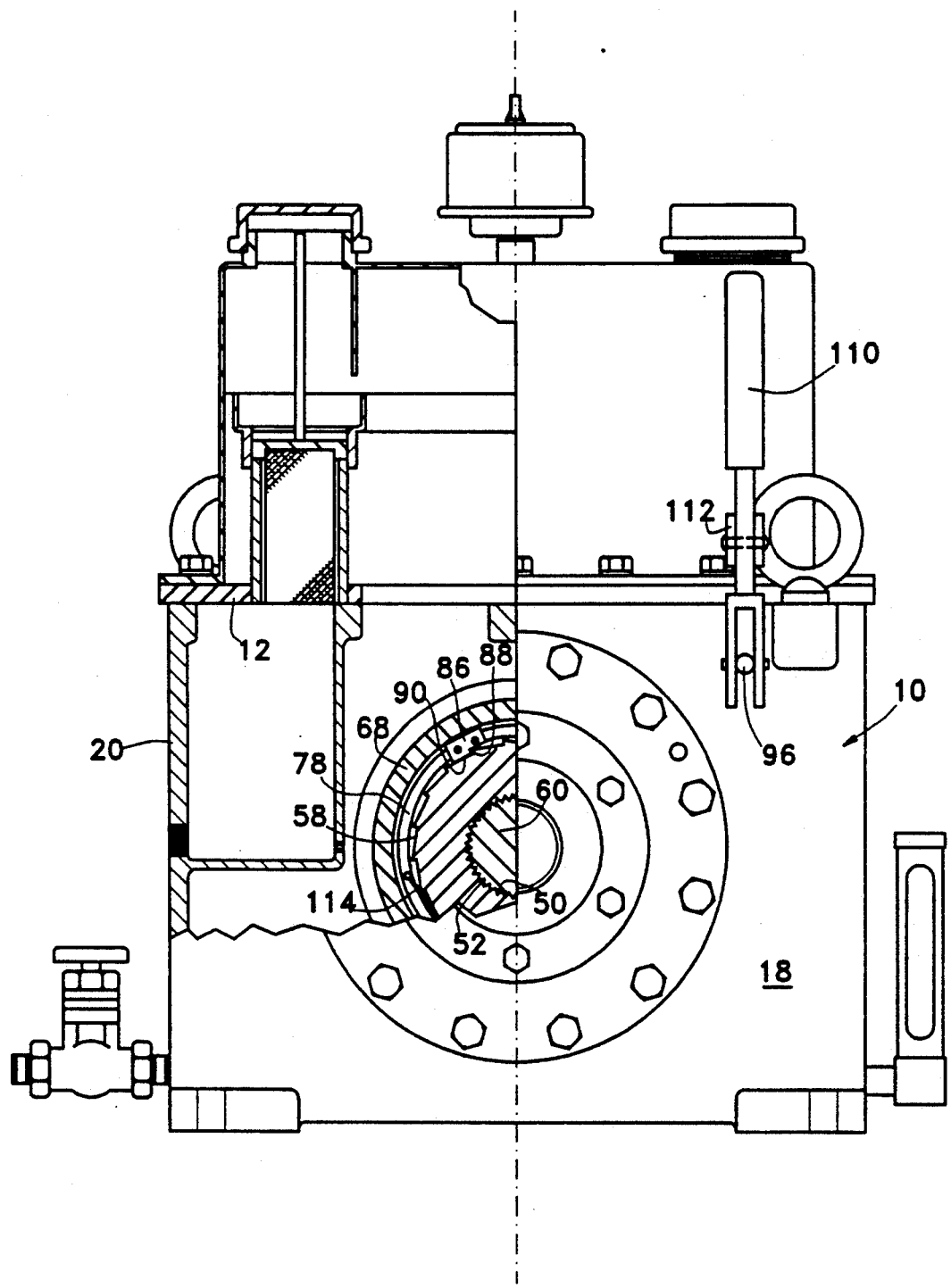
FIG. 2 is a rear elevational view of the one-way clutch assembly partly broken away and in section, as indicated by the line 2—2 of FIG. 1.
Figure 3:
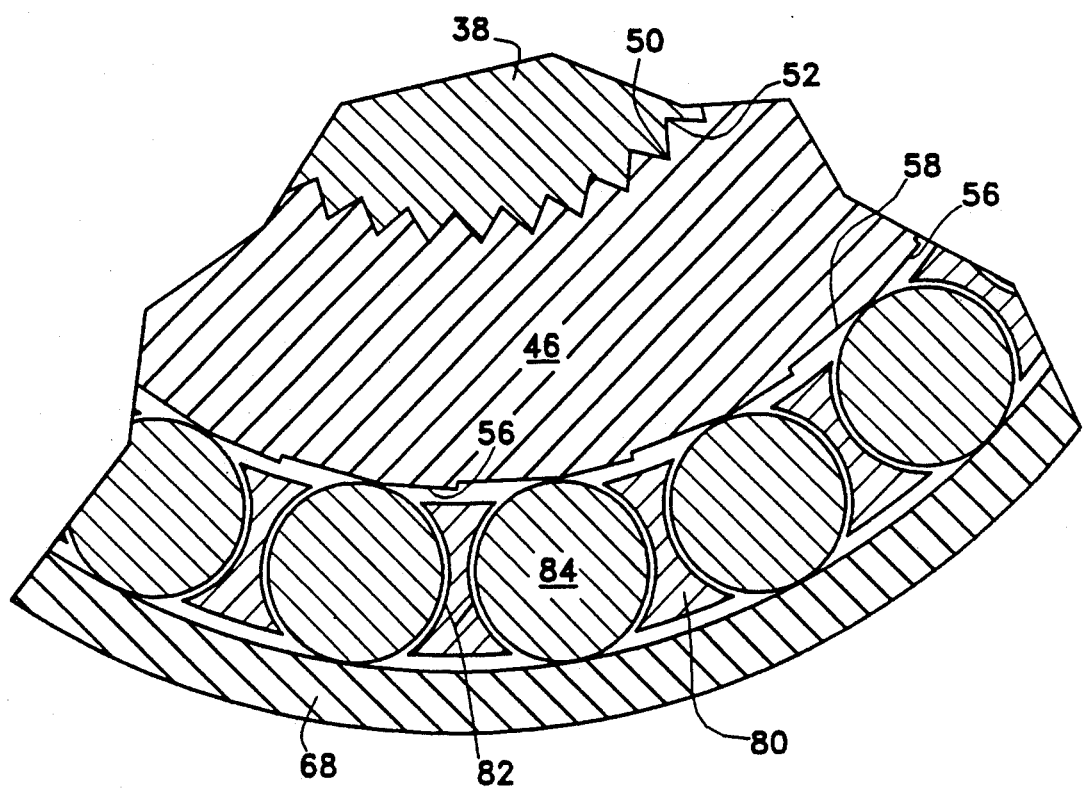
FIG. 3 is a fragmentary sectional view taken along line 3—3 of FIG. 1.

The one-way clutch assembly has a fluid tight housing 10 formed by an upper wall 12, a lower wall 14, a front wall 16, a back wall 18, and side walls 20 and 22. A partition 24 extends between the upper wall 12, lower wall 14 and side walls 20 and 22 to separate the interior of the housing 10 into chambers 26 and 28.

The front wall 16, partition 24, and back wall 18 are provided with apertures 30, 32 and 34, respectively, which are disposed on a common axis 36. An input shaft 38 extends through the apertures 30 and 32 in the front wall 16 and partition 24, and the input shaft 38 is mounted on the housing 10 through bearing assemblies 40 and 42 disposed in the apertures 30 and 32.

The input shaft 38 extends into the chamber 28 from the partition 24 and has one end 44 confronting the aperture 34 in the back wall 18. A hub 46 is provided with a central opening 48 which accommodates a portion of the shaft 38 disposed within the chamber 28, and the hub 46 is slidable on the shaft 38. The hub 46 is also keyed to the shaft 38 to rotate therewith, and in the particular construction of the preferred embodiment, keying is accomplished by a plurality of splines or grooves 50 which extend along the portion of the shaft 38 disposed within chamber 28 parallel to the axis 36. The hub 46 has mating splines or ridges 52 which extend outwardly from the opening 48 in the hub 46 parallel to the axis 36. The shaft 38 is provided with an outwardly extending cap 54 at its end 44 confronting the aperture 34 in the back wall 18, and the cap limits the travel of the hub 46 toward the back wall 18.

The hub 46 has a generally cylindrical outer surface 56 which forms the inner race of the one-way clutch. The outer surface 56 is coaxial with the opening 48 and the axis 36 of the shaft 38 and is provided with a plurality of flat inclined planes 58. Each of the inclined planes 58 is elongated on an axis parallel to the axis of the cylindrical outer surface 56 of the hub 46 and extends from that surface at a common angle to a tangential plane at the intersection of the inclined plane.

An output shaft 60 extends through the aperture 34 in the back wall 18, and is journaled within the aperture 34 by a bearing assembly 62. The shaft 60 carries a cup-shaped member 64 at its end 66 within the chamber 28. The shaft 60 is concentric with the axis 36, and the cup-shaped member 64 has a cylindrical sleeve 68 with an inner cylindrical surface 70 coaxial with the axis 36. The cup-shaped member 64 has a circular disc 72 mounted on the end 66 of the output shaft 60 normal to the axis thereof, and the sleeve 68 is mounted on the disc 72 adjacent to the perimeter thereof and extends from the disc 72 toward the partition 24.

The inner cylindrical surface 70 of the sleeve 68 forms the outer race of the one-way clutch and is spaced from the cylindrical outer surface 56 of the hub 46. A clutch member assembly 74 is disposed between the cylindrical surface 56 of the hub 46 and the cylindrical surface 70 of the cup-shaped member 64.

The clutch member assembly 74 has a cage 76 formed by a pair of rings 78 disposed on opposite sides thereof. A plurality of spaced elongated spacer bars 80 extend between the rings 78 normal to the plane of the rings. The confronting surfaces of adjacent spacer bars 80 are provided with part cylindrical indentations 82, and a roller 84 is rotatably disposed between each pair of confronting spacer bars 80. Each roller 84 confronts an inclined plane 58 of the hub 46. Each ring 78 of the cage 76 carries a stop lug 86 on its surface opposite the spacer bars 80, and the stop lug 86 is provided with an outwardly extending tooth 88 which is translatably disposed within a slot 90 extending into the surface 56 of the hub 46 normal to the central axis thereof. The stop lug 86 thus engages the hub 46 and prevents translation of the cage 76 with respect to the hub 46 along its axis.

The hub 46 with attached cage 76 are translatable along the axis of the input shaft 38, and means are provided to control the position of the hub 46 and cage 76 from the exterior of the housing. This means comprises a collar 92 mounted on the hub 46, a shifting fork 94, and an elongated translatable rod 96. The collar 92 is flat and circular, and has an opening 98 extending therethrough along its central axis. The opening 98 accommodates the shaft 38, and one side of the collar is mounted securely on the end of the hub 46 opposite the disc 72. The collar 92 is also provided with a groove 100 which extends about the entire perimeter thereof in a plane normal to the axis 36.

The shifting fork 94 is provided with a bifurcated end 102 formed by a part circular recess, and the bifurcated end 102 is slidably disposed within the circular groove 100 of the collar 92. The fork 94 has an arm extending from the bifurcated end 102, and the arm is secured on the elongated rod 96 as by welding. The rod 90 extends through orifices 104, 106 and 108, respectively, in the front wall 16, partition 24 and back wall 18 to the exterior of the housing 10. The rod 90 is translatable in the orifices, and the orifices 104 and 108 in the front wall 16 and rear wall 18, respectively, form fluid tight seals to prevent the escape of lubricant from the housing 10. The ends of the rod 96 are accessible from the front wall 16 and the back wall 18 of the housing, and force applied to the rod to translate the rod in a direction out of the front wall 16 will move the collar 92, hub 46 and cage 76 out of the sleeve 68 of the cup-shaped member 64 to disengage the one-way clutch. The one-way clutch is preferably operating in the free wheeling state during removal of the hub 46 and clutch member assembly 74 from the cup-shaped member 64.

In like manner, the collar 92, hub 46 and cage 76 may be translated from a position adjacent to the partition into the sleeve 68 of the cup-shaped member 64 by asserting force on the rod 96 to translate it in a direction toward the front wall 16. FIG. 1 illustrates a lever arm 110 pivotally mounted on a bracket 112 secured to the housing 10 and pivotally attached to the rod 96 to facilitate translation of the collar 92, hub 46 and cage 76 from the disengaged position to the engaged position and visa versa, and further to indicate the position of the one-way clutch.

In order to assure prompt engagement of the one-way clutch when torque is applied to the input shaft 38 in the engaging rotational direction, the cage 76 is provided with a spring 114 to spring bias the rollers 84 high on the inclined planes 58. When the cage 76 is positioned adjacent to the partition 24 of the housing 10, the cage will have rotated with respect to the hub 46 until the tooth 88 of the stop lug 86 has engaged the end of the slot 90, thus positioning the rollers 84 at their most extended position. In order to reinsert the cage 76 into the sleeve 68 of the cup-shaped member 64, it is necessary to move the rollers to confront a lower portion of the inclined planes 58 of the inner race. For this purpose, a circular rim 116 extends outwardly from the end of the sleeve 68 opposite the disc 72 of the cup-shaped member 64. The rim 116 has an inner surface 118 adjacent to the sleeve 68 with the same diameter as the sleeve 68, but this inner surface 118 is conical and flares outwardly from the sleeve 68. As a result, translation of the collar 92, hub 46 and cage 76 from a position adjacent to the partition 24 of the housing toward the sleeve 68, causes the leading edge of the rollers 84 of the clutch member assembly 74 to engage the conical surface 118 of the rim 116. With the shafts 38 and 60 driven to produce a free wheeling condition for the one-way clutch, the force exerted by the rim 116 causes the cage 76 to rotate with respect to the hub 46 to position the rollers 84 on a lower portion of the inclined planes 58. In this manner, the clutch member assembly 74 will contract to permit it to slide into the cylindrical surface 70 of the sleeve 68 to assume engaging position.

The one-way clutch of the present invention utilizes the lubrication system disclosed in U.S. Pat. No. 3,175,667 of Joseph A. Marland referred to above. The clutch member assembly 74 and the inner and out races of the one-way clutch are provided with a combination of splash lubrication and low pressure lubrication. The disc 72 of the cup-shaped member 64 is provided with an outwardly extending lip 120 coaxially disposed about the shaft 56 on its side confronting the rear wall 18 of the housing to collect oil from the spray produced by rotation of the one-way clutch. The oil flows through passageways 122 to the clutch member assembly 74, the surface 70 of the sleeve 68, and the surface 56 of the hub 46 to provide lubrication of all portions of the one-way clutch. When the hub 46, collar 92 and clutch member assembly 74 are translated out of the sleeve 68 to a position adjacent to the partition 24, the lubrication is terminated, but the clutch member assembly is at rest and requires no lubrication. Further, as long as the output shaft is rotating, oil will be delivered to the lip 120 of the disc 72, and the oil will flow across the surface 70 of the sleeve 68, thus facilitating insertion of the hub 46 and clutch member assembly 74 into the cup-shaped member 64.

The one-way clutch assembly of the present invention is also provided with a mechanical brake assembly 124 to lock input shaft 38 in a fixed position for servicing and the like. The brake assembly has a brake shoe 126 disposed within the chamber 26 of the housing 10 confronting a cylindrical portion 128 of the shaft 38 which serves as a brake drum. The brake shoe 126 is journaled on one end of a shaft 130, and the shaft 130 has a threaded portion 132 which extends through a threaded opening 134 in the upper wall 12 of the housing 10. A lever arm 136 is mounted on the end of the shaft exterior of the housing 10 to facilitate rotation of the shaft 130 to force the brake shoe 126 into engagement with the cylindrical portion 128 of the shaft 38.

Based on the foregoing specification, those skilled in the art will devise modifications and improvements within the scope of the present invention. It is therefore intended that the scope of the present invention be not limited by the foregoing specification, but only by the appended claims.

The invention claimed is:

1. A disengagable one-way clutch assembly comprising, in combination: a housing having a first wall provided with a first aperture and a second wall provided with a second aperture, the first and second apertures extending through the first and second walls respectively and defining an axis; a first shaft rotatably mounted within the aperture in the first wall and extending from the first wall into the housing toward the second wall, said first shaft having one end confronting the aperture in the second wall; a second shaft rotatably mounted in the aperture in the second wall coaxially with the first shaft, the second shaft having one end spaced from and confronting the one end of the first shaft; a cup-shaped member having a cylindrical recess extending therein from one end and an opposed other end, said other end of the cup-shaped member being mounted on the one end of the second shaft, the cylindrical inner surface of the cup-shaped member being coaxial with the first and second shafts and forming the outer race for a one-way clutch, the first shaft having linear splines disposed parallel to the axis thereof extending between the one end of the first shaft and the first wall; a hub having an elongated linear opening extending therethrough and a cylindrical outer surface extending about the opening and forming the inner race for the one-way clutch, said opening of said hub being provided with linear splines disposed parallel to the axis of the first shaft, said hub being slidably mounted on the first shaft between the one end of the shaft and the first wall with the splines thereof engaging the splines of the shaft, said hub being slidable on the first shaft between two spaced positions, the first of said positions being adjacent to the one end of the first shaft and positioning the hub confronting the inner cylindrical surface of the cup-shaped member, and the second of said positions being adjacent to the first wall and positioning the hub in spaced relation to the cup-shaped member; a one-way clutch member assembly mounted on one of the races, said clutch member assembly having a generally cylindrical outer surface conforming to the inner surface of the cup-shaped member and a generally cylindrical inner surface conforming to the outer surface of the hub, said clutch member assembly being adapted to engage the inner surface of the cup-shaped member and the outer surface of the hub when the hub is disposed within the cylindrical recess of the cup-shaped member to function as a one-way clutch, said clutch member assembly being unable to engage both of the races when the hub is in a position on the shaft outside of the cylindrical recess of the cup-shaped member, and guide means associated with the cup-shaped member to facilitate translating the hub from the second position on the first shaft to the first position thereon.

2. A disengagable one-way clutch assembly comprising claim 1 wherein the guide means comprises a circular hollow rim extending outwardly form the one end of the cup-shaped member, said rim having an outward flaring truncated conical surface extending from the cylindrical inner surface at the one end of the cup-shaped member, the diameter of the conical surface at the end of the rim opposite the cup-shaped member being greater than the diameter of the combined hub and one-way clutch member assembly.

3. A disengagable one-way clutch assembly comprising claim 1 in combination with means actuable from outside of the housing for translating the hub between the first and second positions on the first shaft.

4. A disengagable one-way clutch assembly comprising claim 3 wherein the means for translating the hub between the first and second positions on the first shaft comprises a circular collar having an axial cylindrical opening and a perimetrical circular groove, the collar being mounted on the hub with the first shaft slidably extending through the opening in the collar and the groove being coaxial with the axis of the first shaft, a bifurcated fork slidably engaging the circular groove of the collar, and lever arm means mounted on the housing and extending from the bifurcated fork to the exterior of the housing for actuating the fork to translate the collar and hub between the two positions on the first shaft.

5. A disengagable one-way clutch assembly comprising claim 1 wherein the clutch member assembly comprises a plurality of cylindrical rollers disposed with their axes parallel to the axes of the races, and one of the races is provided with an inclined plane confronting each roller of the clutch member assembly, each of said inclined planes being parallel to the axes of the first and second shafts.

6. A disengagable one-way clutch assembly comprising, in combination: a housing having a first wall and a second wall, the first wall and second wall of the housing each having an aperture extending therethrough and said apertures defining a linear axis; a first shaft aligned with the axis of the apertures and rotatably mounted within the apertures in the first wall, said first shaft extending from the first wall into the housing toward the second wall and the one end of the first shaft confronting the aperture in the second wall; a second shaft rotatably mounted in the aperture in the second wall and disposed coaxially with the first shaft, the second shaft having one end spaced from and confronting the one end of the first shaft; a cup-shaped member having a cylindrical recess extending therein from one end and an opposed other end, said other end of the cup-shaped member being mounted on the one end of the second shaft, the cylindrical inner surface of the cup-shaped member being coaxial with the first and second shafts and forming the outer race for a one-way clutch, the first shaft having linear splines disposed parallel to the axis of the first shaft extending between the one end thereof and the first wall; a hub having a cylindrical opening extending therethrough from one end to an opposed other end and a generally cylindrical outer surface extending about the opening and forming the inner race of a one-way clutch, said opening of said hub being provided with linear splines disposed parallel to the axis of the first shaft and said hub being slidably mounted on the first shaft between the one end of the shaft and the first wall with the splines thereof engaging the splines of the shaft, said hub being slidably on the first shaft between two spaced positions, the first of said positions being adjacent to the one end of the first shaft and positioning the hub confronting the inner cylindrical surface of the cup-shaped member, and the second of said positions being adjacent to the first wall and positioning the hub spaced from the cup-shaped member, the generally cylindrical outer surface of the hub being provided with a plurality of spaced elongated flat inclined planes, each of the inclined planes having its axis of elongation parallel to the axis of the first shaft; and a one-way clutch member assembly mounted on the cylindrical outer surface of the hub, said clutch member assembly having a cylindrical cage comprising a pair of outer rings and elongated spaced spacers extending between the rings, each of the spacers being parallel to the first shaft and having elongated part cylindrical surfaces on opposite sides thereof, and an elongated cylindrical roller rotatably disposed between the part cylindrical surfaces of adjacent spacers with its axis of elongation parallel to the axis of the first shaft, each of said rollers confronting an inclined plane of the hub and the inner cylindrical surface of the cup-shaped member, when the hub is positioned at the first position on the first shaft the rollers of the assembly wedging between the inclined planes of the hub and the cylindrical inner surface of the cup-shaped member in response to torque in one rotational direction and the hub rotating freely within the cup-shaped member in response to rotational torque in the reverse direction, the rollers being unable to engage the cylindrical inner surface of the cup-shaped member for either direction of rotation when the hub and the roller assembly are disposed at the second position on the first shaft, and guide means mounted on the cup-shaped member to facilitate translating the hub from the second position on the first shaft to the first position on the first shaft.

7. A disengagable one-way clutch assembly comprising claim 6 wherein the guide means comprises a circular hollow rim extending outwardly from the one end of the cup-shaped member, said rim having an outward flaring truncated conical surface extending from the cylindrical inner surface at one end of the cup-shaped member, the diameter of the conical surface at the end of the rim opposite the cup-shaped member being greater than the diameter of the combined hub and one-way clutch member assembly.

* * * * *

UNITED STATES PATENT AND TRADEMARK OFFICE
CERTIFICATE OF CORRECTION

PATENT NO. : 5,158,164

DATED : October 27, 1992

INVENTOR(S) : Clarence A. Seaton

It is certified that error appears in the above-identified patent and that said Letters Patent is hereby corrected as shown below:

Column 6, line 33, "form" should be --from--.

Signed and Sealed this

Twelfth Day of January, 1993

Attest:

DOUGLAS B. COMER

Attesting Officer  Acting Commissioner of Patents and Trademarks